US010203448B1

(12) United States Patent
Li

(10) Patent No.: US 10,203,448 B1
(45) Date of Patent: Feb. 12, 2019

(54) BACKLIGHT ASSEMBLY, BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Wenjun Li, Beijing (CN)

(73) Assignees: BOE TECHNOLOGY GROUP CO., LTD., Beijing (CN); BEIJING BOE CHANTANI ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 15/968,698

(22) Filed: May 1, 2018

(30) Foreign Application Priority Data

Sep. 29, 2017 (CN) ...................... 2017 2 1275287 U

(51) Int. Cl.
*G02B 6/00* (2006.01)
*F21V 8/00* (2006.01)
(52) U.S. Cl.
CPC ......... *G02B 6/0068* (2013.01); *G02B 6/0073* (2013.01); *G02B 6/0083* (2013.01)
(58) Field of Classification Search
CPC ............................ G02B 6/0068; G02B 6/0073
USPC ....................................................... 362/612
See application file for complete search history.

(56) References Cited

U.S. PATENT DOCUMENTS

| 2008/0123367 | A1  | 5/2008  | Pan et al. |
| 2010/0149802 | A1* | 6/2010  | Chang ................... G02B 6/002 362/235 |
| 2011/0273906 | A1* | 11/2011 | Nichol ................ G02B 6/0076 362/607 |
| 2013/0242602 | A1* | 9/2013  | Chang ................... G02B 6/004 362/606 |
| 2015/0253484 | A1* | 9/2015  | Araki .................. G02B 6/0031 349/65 |
| 2016/0069525 | A1* | 3/2016  | Chen ................... F21S 48/1241 362/612 |

FOREIGN PATENT DOCUMENTS

| CN | 102954391 A | 3/2013 |
| TW | 200823558 A | 6/2008 |

* cited by examiner

*Primary Examiner* — Christopher Raabe
(74) *Attorney, Agent, or Firm* — Kinney & Lange, P.A.

(57) ABSTRACT

Embodiments of the present disclosure provide a backlight assembly, a backlight module, and a display device. The backlight assembly of the present disclosure comprises a light guide plate and a light bar, wherein an edge of a light-entering end of the light guide plate comprises one or more first edge segments and one or more second edge segments, and the one or more first edge segments protrude from positions of the edge of the light-entering end of the light guide plate other than the one or more second edge segments in a direction facing away from the light guide plate. The light bar comprises one or more LED light bars disposed on one or more light-entering side of the one or more first edge segments and one or more line light sources disposed on one or more light-entering sides of the one or more second edge segments.

20 Claims, 9 Drawing Sheets

BACKLIGHT ASSEMBLY, BACKLIGHT MODULE AND DISPLAY DEVICE

CROSS-REFERENCE TO RELATED APPLICATION

This application claims a priority to Chinese Patent Application No. 201721275287.4 filed on Sep. 29, 2017, the disclosure of which is incorporated in their entirety by reference herein.

TECHNICAL FIELD

The present disclosure relates to the field of display technology, in particular to a backlight assembly, a backlight module, and a display device.

BACKGROUND

Nowadays, the development of display devices is getting faster and faster. With the rise of touch-screen mobile phones, the use of narrow bezels in the mobile phones has become a trend because the use of a narrow bezel makes a front face of the phone more compact. However, in the existing narrow-bezel mobile phones, only bezels on both sides of the mobile phone are narrowed, and it is difficult for upper and lower bezels to realize a narrow bezel design because they accommodate electronic components. For example, for a lower bezel portion provided with a home button, since a light bar, a microphone, and other components are usually mounted in the bezel, a narrow bezel design can hardly be achieved.

SUMMARY

In a first aspect, the present disclosure provides a backlight assembly, including a light guide plate and a light bar, wherein an edge of a light-entering end of the light guide plate includes one or more first edge segments and one or more second edge segments, the one or more first edge segments protrude from one or more positions of the edge of the light-entering end of the light guide plate other than the one or more second edge segments, in a direction facing away from the light guide plate, and the light bar comprises one or more Light Emitting Diode (LED) light bars disposed on one or more light-entering sides of the one or more first edge segments, and one or more line light sources disposed on one or more light-entering sides of the one or more second edge segments.

In a possible embodiment of the present disclosure, there are at least two second edge segments, and the at least two second edge segments comprise two second edge segments constituting two end segments of the edge of the light-entering end.

In a possible embodiment of the present disclosure, the first edge segment or one of the first edge segments constitutes an intermediate segment between the two end segments of the edge of the light-entering end, and the two second edge segments constituting the two end segments of the edge of the light-entering end are symmetrical to each other with respect to the intermediate segment.

In a possible embodiment of the present disclosure, extension directions of the line light sources disposed on the light-entering sides of the at least two second edge segments are in a same straight line.

In a possible embodiment of the present disclosure, the or each LED light bar comprises a first circuit board and a plurality of LED lights disposed on the first circuit board, and the or each line light source comprises a second circuit board and a line light source body disposed on the second circuit board.

In a possible embodiment of the present disclosure, the first circuit board and the second circuit board constitute an integrated circuit board.

In a possible embodiment of the present disclosure, the or each line light source body comprises a circuit substrate, a plurality of light-emitting chips and a fluorescent film, wherein the circuit substrate has a strip shape, the plurality of light-emitting chips are all attached to the circuit substrate and arranged to be evenly spaced apart in a longitudinal direction of the circuit substrate, and the fluorescent film is provided on the circuit substrate and covers the plurality of light-emitting chips.

In a possible embodiment of the present disclosure, the or each line light source body has a side wall that is attached to the corresponding second circuit board, a top wall that is opposite to the corresponding second edge segment, and a bottom wall that is welded to the corresponding second circuit board by performing fillet welding at one or more welding points.

In a possible embodiment of the present disclosure, a protruding height of the or each LED light from the or each corresponding first circuit board is equal to a protruding height of the or each line light source body from the or each corresponding second circuit board.

In a possible embodiment of the present disclosure, a protruding height of the or each LED light from the or each corresponding first circuit board is $h_1$, a protruding height of the or each line light source body from the or each corresponding second circuit board is $h_2$, and $h_1$ is greater than $h_2$.

In a possible embodiment of the present disclosure, the light guide plate includes a main body portion having a thickness of d, and a protruding portion arranged to protrude from a portion of the edge of the light-entering end other than the one or more second edge segments, in a direction facing away from the main body portion, wherein d is less than $h_1$ but greater than $h_2$, and in the protruding direction of the protruding portion, a thickness of the protruding portion gradually increases from d to $d_1$ that is greater than $h_1$.

In a possible embodiment of the present disclosure, a protruding distance of the or each first edge segment from the or each corresponding position of the edge of the light-entering end of the light guide plate other than the one or more second edge segments, in the direction facing away from the light guide plate, is less than or equal to 2.5 mm.

In a possible embodiment of the present disclosure, thicknesses of both the or each first circuit board and the or each second circuit board are 0.12 mm, 0.1 mm, 0.08 mm, or less than 0.08 mm.

In a possible embodiment of the present disclosure, a protruding height of the or each line light source body from the or each corresponding second circuit board is 0.4 mm, 0.35 mm or 0.3 mm.

In a possible embodiment of the present disclosure, a gap between the or each first edge segment and the or each corresponding LED light and a gap between the or each second edge segment and the or each corresponding line light source body have a width that is less than or equal to 0.12 mm.

In a possible embodiment of the present disclosure, electronic components are arranged in a gap at a side of the second edge segment facing away from the light guide plate.

In a second aspect, the present disclosure provides a backlight module including the backlight assembly in any of the technical solutions as described above.

In a possible embodiment of the present disclosure, the backlight module further includes a light-shielding tape configured to cover a light-exiting side of the light-entering end of the light guide plate in the backlight assembly.

In a possible embodiment of the present disclosure, a distance from an inner edge of the light-shielding tape to an effective light-exiting surface of the or each line light source body in the backlight assembly is in a range of 0.8 mm to 1.5 mm, and/or a distance from the inner edge of the light-shielding tape to an effective light-exiting surface of the or each LED light in the backlight assembly is in a range of 2.0 mm to 3.5 mm.

In a third aspect, the present disclosure provides a display device including the backlight module in any of the technical solutions as described above.

BRIEF DESCRIPTION OF THE DRAWINGS

To make the embodiments of the present disclosure or technical solutions in related art more apparent, accompanying drawings necessary for the description of the embodiments or the related art will be briefly described below. Apparently, the drawings in the following description relate to merely some embodiments of the present disclosure. For a person having ordinary skills in the art, other drawings can be also obtained based on these drawings without exercising any creative work.

DETAILED DESCRIPTION

Below, the technical solutions of the embodiments of the present disclosure will be described in a clear and complete manner with reference to the drawings of the embodiments. Apparently, the described embodiments are merely a part of, rather than all of, the embodiments of the present disclosure. Based on these embodiments, a person skilled in the art may obtain the other embodiments, which also fall within the scope of the present disclosure.

In the description of the present disclosure, it should be understood that orientations or positional relationships indicated by such terms as "center", "up", "down", "front", "back", "left", "right", "vertical", "horizontal", "top", "bottom", "inner" and "outer" are those indicated on the basis of the drawings and cannot be construed as the limitation of the present disclosure because they are only for facilitating and simplifying the description of the present disclosure, rather than indicating or implying that the stated device or element must have a specific orientation or be constructed and operated in the specific orientation. In the description of the present disclosure, "a plurality of" means that the number is two or more, unless stated otherwise.

Figure 1:
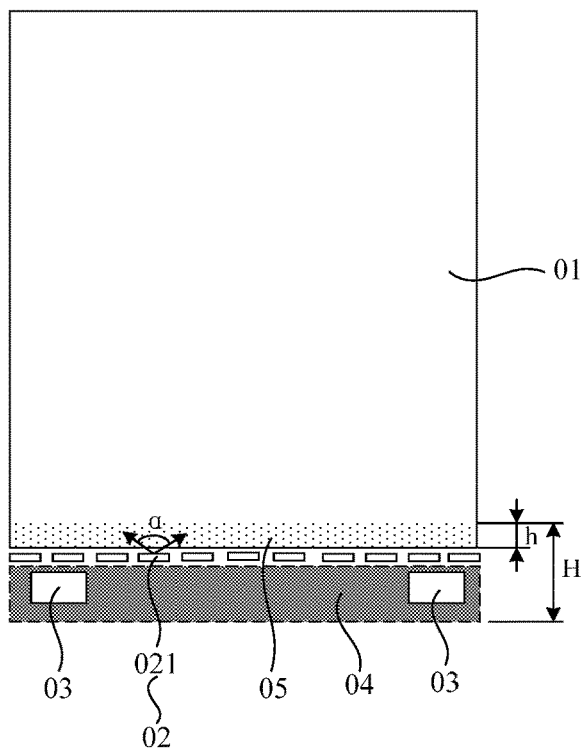
FIG. 1 is a schematic view showing an internal structure of a mobile phone in the related art.

FIG. 1 is a schematic view showing an internal structural of a mobile phone in the related art, which includes a light guide plate 01, a light bar 02, electronic components such as a microphone 03, etc. The light bar 02 is located at a lower side of the light guide plate 01, and an electronic-components-mounting area 04 in which electronic components such as microphones are mounted is formed at a lower side of the light bar 02. Light emitted from the light bar 02 enters the light guide plate 01 from a lower end of the light guide plate 01. Within a certain range of a width of the lower end of the light guide plate 01, a light-mixing area 05 with low uniformity is formed since light emitted from the light bar 02 is not uniformly mixed. The light-mixing area 05, therefore, needs to be covered by a light-shielding tape so as to ensure the display quality of the display device. However, the light bar 02 in the related art is usually a light-emitting diode (LED) light bar, the LED light bar includes a plurality of point LED lights 021 that are spaced apart in a straight line, and a diffusion angle α of the LED light 021 is relatively small (usually 120°), resulting in a larger width h of the light-mixing area 05, which is usually in a range of 2.5 mm to 3.2 mm. Consequently, the light-shielding tape is required to cover a wider area to ensure the display quality. As a result, the width H of the lower bezel of the mobile phone is larger.

Figure 2:
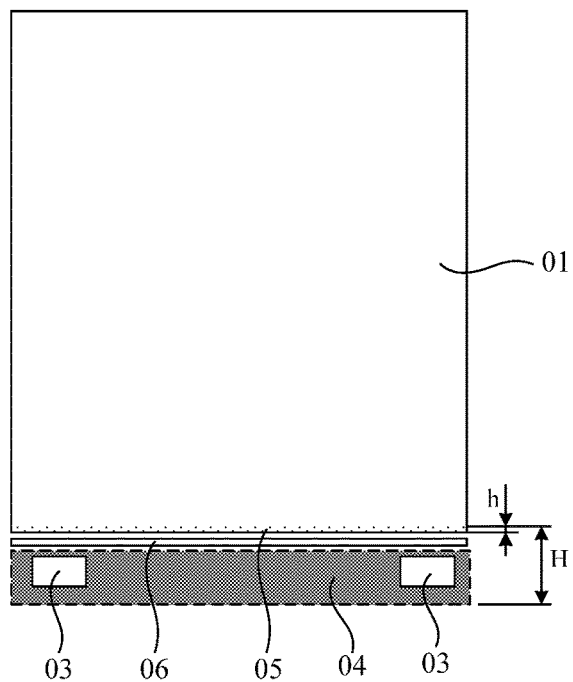
FIG. 2 is another schematic view showing an internal structure of another mobile phone in the related art.

In order to reduce the width H of the lower bezel of the mobile phone, one solution in the related art is to replace the LED light bar 02 in FIG. 1 with a line light source 06, as shown in FIG. 2. Since a light-exiting angle of the line light source 06 can be up to 180°, a width h (about 0.8 mm) of the light-mixing area 05 on the light guide plate and thus a width of the light-shielding tape for covering the light-mixing area can be reduced. Therefore, the width H of the lower bezel of the mobile phone can be reduced too. However, the price of the line light source is usually higher, resulting in a substantial increase in the cost of the mobile phone.

Figure 3:
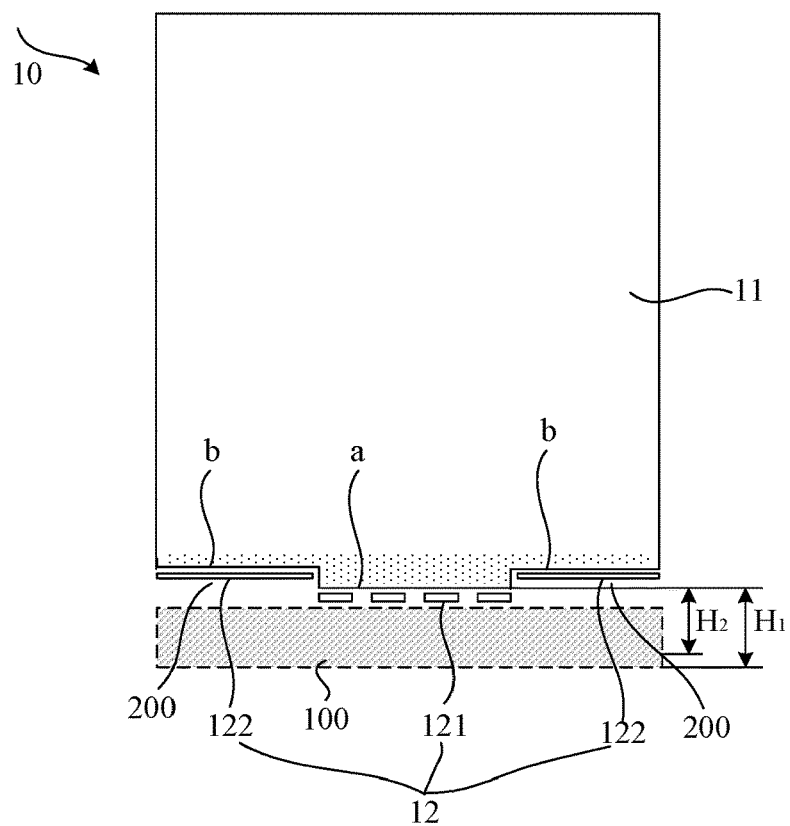
FIG. 3 is a schematic view showing a structure of a backlight assembly of an embodiment of the present disclosure.

Referring to FIG. 3, which shows a specific embodiment of a backlight assembly 10 of the present disclosure, which includes a light guide plate 11 and a light bar 12, an edge of a light-entering end of the light guide plate 11 includes a first edge segment indicated by "a" and second edge segments indicated by "b", and the first edge segment a protrudes from a position of the edge of the light-entering end other than the second edge segments b. The light bar 12 includes LED light bars 121 provided at a light-entering side of the first edge section a, and line light sources 122 provided at light-entering sides of the second edge segments b.

In the backlight assembly 10 of the present disclosure, it includes the light guide plate 11 and the light bar 12. The edge of the light-entering end of the light guide plate 11 includes the first edge segment indicated by "a" and the second edge segments indicated by "b", and the first edge segment a protrudes from the position of the edge of the light-entering end other than the second edge segments b. Moreover, the light bar 12 includes the LED light bars 121 disposed at the light-entering side of the first edge segment a, and the line light sources 122 disposed at the light-entering side of the second edge segments b. Therefore, at a side of the second edge segment b facing away from the light guide plate 11, a gap 200 is formed. When the backlight assembly 10 is applied in a display device such as a mobile phone, in addition to the line light source 122, the gap 200 may accommodate for electronic devices which were to be mounted at a side of the light bar 12 away from the light guide plate 11, thus making it possible to reduce an area of the original electronic-components-mounting area 100, and thus shortening a distance from the first edge segment a to an outer edge of the electronic-components-mounting area 100, i.e., an edge of a side of the electronics-components-mounting area 100 away from the light guide plate 11. As a result, it is possible to reduce the width of the bezel provided with the light bar 12 in the display device. Meanwhile, since the light bar 12 consists of the line light sources 122 and the LED light bars 121, and the price of the LED light bar is low, the cost of the backlight assembly can be reduced as compared with the technical solution using line light sources only. Moreover, the combination of the LED light bar, the line light source and the light guide plate with a unique shape forms a backlight structure having a narrow bezel on a partial portion and a unique shape.

In the above embodiment, it should be noted that the edge of the light-entering end of the light guide plate 11 is actually a side wall on a side of the light guide plate 11 for light entry. Since the light guide plate 11 has a small thickness, the side wall has a very small height and thus can be regarded as an edge. Moreover, it should be noted that, the first edge segment a projecting from the position of the edge of the light-entering end of the light guide plate other than the second edge segments b means that the first edge segment a projects from the position of the edge of the light-entering end of the light guide plate other than the second edge segments in a direction facing away from the light guide plate 11.

Figure 4:
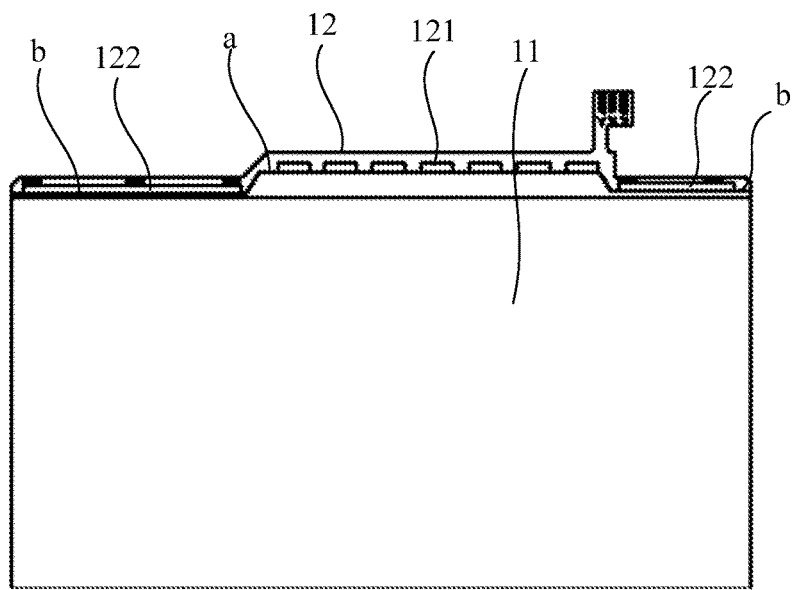
FIG. 4 is a schematic view showing another structure of a backlight assembly of an embodiment of the present disclosure.

The light bar 12 may be provided at any side of the light guide plate 11. For example, the light bar 12 may be provided at a lower side of the light guide plate 11 as shown in FIG. 3, or may be provided at an upper side of the light guide plate 11 as shown in FIG. 4. The specific position of the light bar 12 will not be particularly defined herein.

Figure 5:
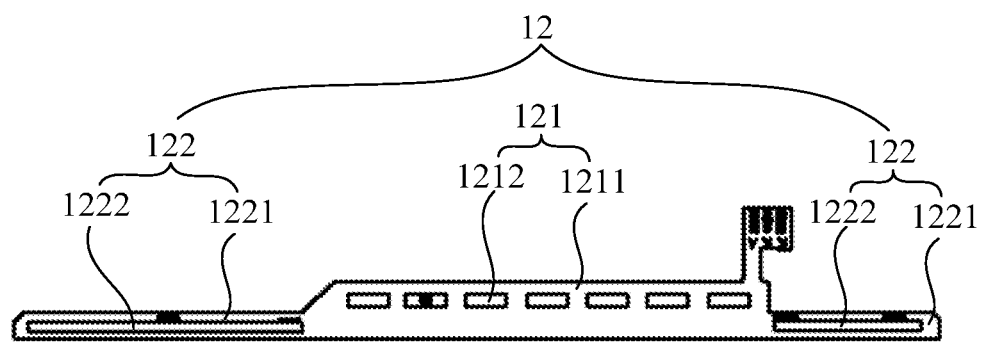
FIG. 5 is a front view of a light bar in a backlight assembly of an embodiment of the present disclosure.

FIGS. 3 to 5 illustratively show two second edge segments b and one first edge segment a between the two second edge segments b.

Figure 7A:
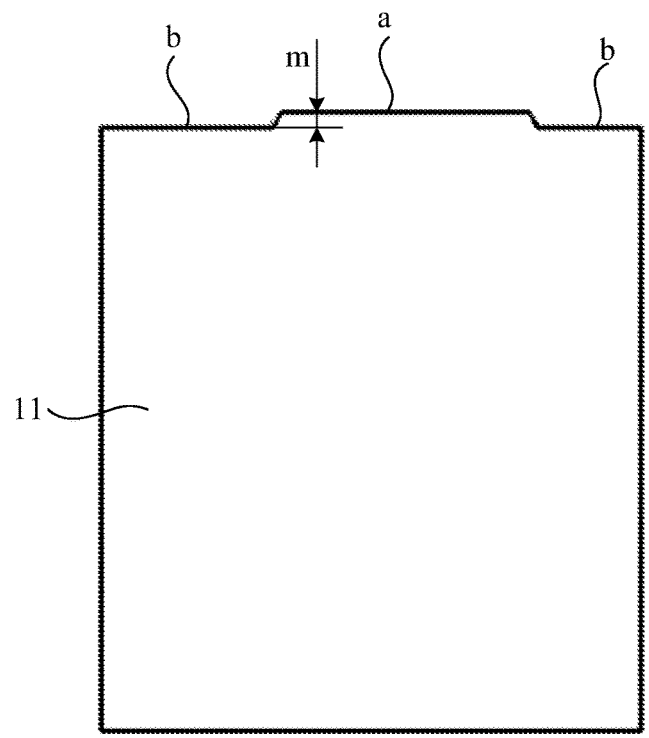
FIGS. 7A, 7B and 7C are front views of a light guide plate in a backlight assembly of an embodiment of the present disclosure.
Figure 7B:
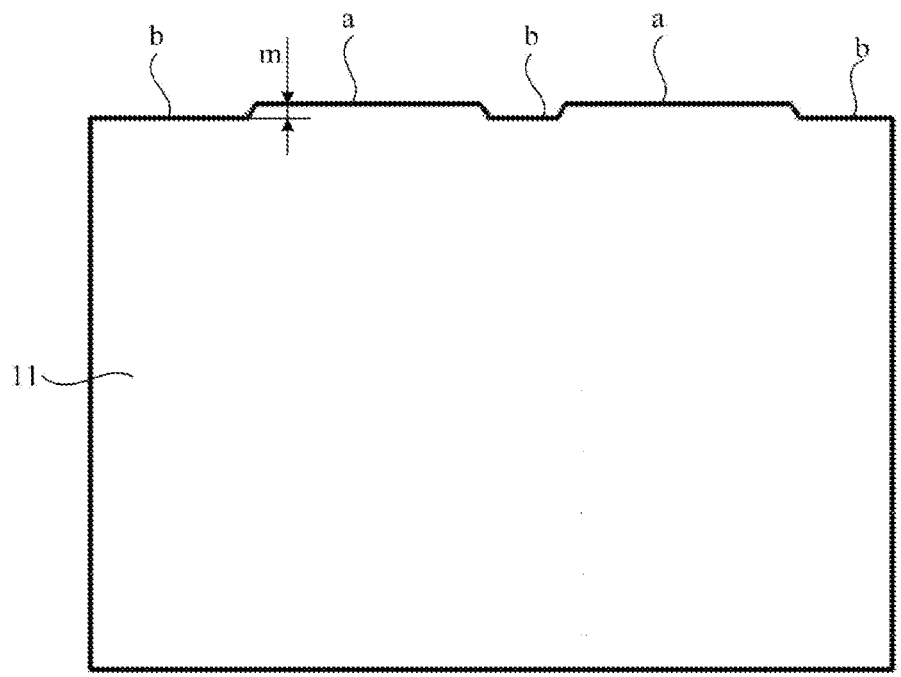
Figure 7C:
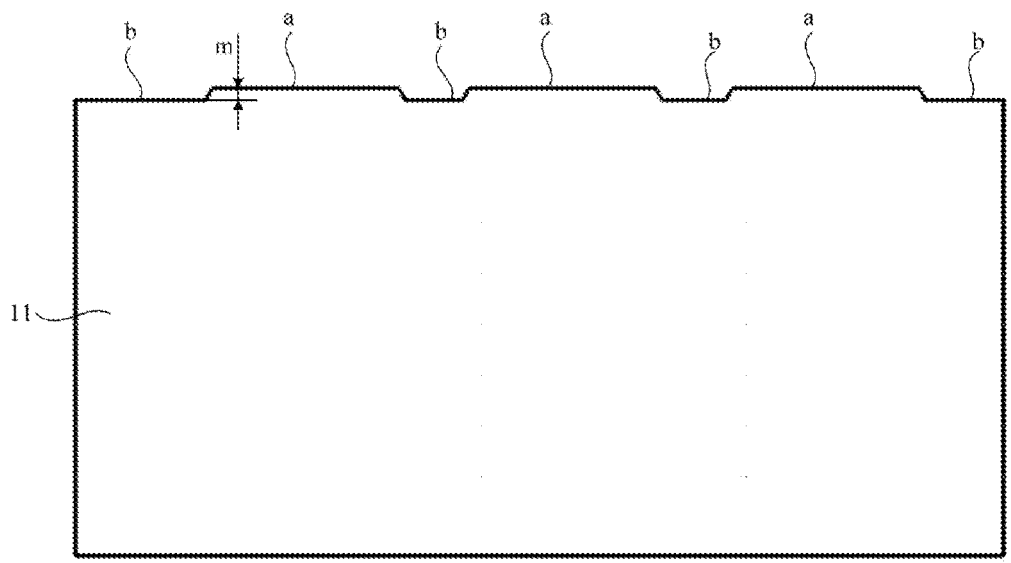
Figure 8:
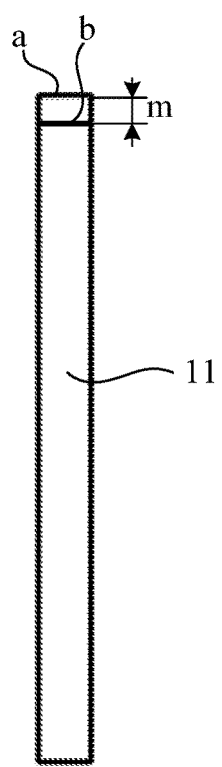
FIG. 8 is a side view of the light guide plate in the backlight assembly shown in FIG. 7A.

It should be noted that, the number of the first edge segments a may be one, two, three or the like, and will not be particularly defined here. The number of the second edge segments b may also be one, two, three or the like, and will not be particularly defined here, either. Moreover, absolute and relative positions of the first edge segment a and the second edge segment b are not particularly defined herein. A case where the number of the first edge segment is one is shown in FIG. 7A, another case where the number of the first edge segments is two is shown in FIG. 7B, and yet another case where the number of the first edge segments is three is shown in FIG. 7C. Based on the contents of the embodiments of the present disclosure, a person skilled in the art may also design other appropriate number of the first edge segments a as needed, which will not be described in detail here.

In addition, the length, width and thickness of the light guide plate 11 are not defined, and may be determined based on a specific dimension of the display device.

Further, lengths of the first edge segment a and the second edge segment b in an extension direction of the light bar are not particularly defined, and may be designed based on a specific dimension of an electronic component to be embedded in the gap 200 shown in FIG. 3. Moreover, the lengths and widths of the LED light bar 121 and the line light source 122 are not particularly defined, and may be chosen based on a specific dimension of the display device. In order to facilitate the mounting of the line light source 122 in the gap 200 at the side of the second edge segment b facing away from the light guide plate 11, optionally, the length of the second edge segment b should be greater than that of the line light source 122.

Since the LED light bar in the related art includes a plurality of LED lights arranged uniformly and linearly, among the of the plurality of LED lights, the number of the LED lights, of which light can reach an intermediate segment of the edge of the light-entering end of the light guide plate is large, resulting in a high intensity of light received in a central region of the light guide plate, and the number of the LED lights, of which light can reach both ends of the edge of the light-entering side of the light guide plate is relatively small, resulting in a relatively low intensity of light received in regions on both sides of the light guide plate. As a result, the brightness uniformity of the backlight generated by the backlight assembly is low. In order to solve this problem, in the embodiment of the present disclosure, optionally, there are at least two second edge segments b, and the at least two second edge segments b include two second edge segments b constituting two end segments of the edge of the light-entering end, as shown in FIGS. 3 and 4. Since a line light source 122 is provided at a light-entering side of the corresponding second edge segment b, and has a higher intensity of emitted light than the LED light bar 121, such an arrangement facilitates the improvement of the illumination intensity of light received in the region on both sides of the light guide plate 11, and thus of the uniformity of backlight of the backlight assembly 10.

In the above embodiment, the two line light sources, which correspond to the two second edge segments b constituting the two end segments of the light-entering end, respectively, can be made into structures that are symmetrical to each other and have identical sizes. In this case, the intensity of light emitted from the line light sources can be kept consistent, which helps to keep the illumination intensity of the light received in the regions on both side of the light guide plate consistent. Moreover, these two line light sources may be arranged collinearly, i.e., extension directions of the two line light sources are in a same straight line, or may not be provided collinearly. The arrangement of the two line light sources will not be defined herein, and may be determined based on an actual application situation.

In order to facilitate the mounting of the light bar in the space-limited display device, optionally, the LED light bar 121 includes a first circuit board 1211 and a plurality of LED lights 1212 provided on the first circuit board 1211, and the line light source 122 includes a second circuit board 1221 and a line light source body 1222 provided on the second circuit board 1221, as shown in FIG. 5. Optionally, both the first circuit board 1211 and the second circuit board 1221 are flexible printed circuit (FPC) boards. As compared with the printed circuit board (PCB), the flexible printed circuit board is made of a flexible material, and may be bent into a shape that matches the mounting space, facilitating the mounting. Moreover, the flexible printed circuit board has advantages such as a high wiring density, a light weight, and a small thickness, and thus has a small volume and occupies less space, thereby facilitating the mounting thereof in the space-limited display device.

The LED light 1212 and the line light source body 1222 may be mounted on the first circuit board 1211 and the second circuit board 1221 using through hole technology (THT) or surface mounted technology (SMT), respectively, and a specific process will not be particularly defined herein. However, due to a high density of assembly, a small volume and light weight of the assembled light bar when the SMT is used for the assembly, it is preferable that the LED lights 1212 and the line light source body 1222 are mounted on the first circuit board 1211 and the second circuit board 1221 using the SMT technology, respectively. The LED lights 1212 may be mounted on the first circuit board 1211 using the conventional surface mounted technology. In other words, their bottom surfaces are mounted on the first circuit board 1211.

In addition, the LED lights 1212 and the line light source body 1222 may be single-faced light-emitting structures, or may be multi-faced light-emitting structures, and they are not particularly defined herein as long as a surface of the LED light 1212 opposite to the first edge segment indicated by "a" and a surface of the line light source body 1222 opposite to the second edge segment indicated by "b" are light-emitting surfaces. In the case where the LED lights 1212 and the line light source body 1222 are multi-faced light-emitting structures, only light emitted from a surface of the LED light 1212 opposite to the first edge segment indicated by "a" and from a surface of the line light source body 1222 opposite to the second edge segment indicated by "b" can enter the light guide plate 11 for backlighting. Therefore, the surface of the LED light 1212 opposite to the first edge segment indicated by "a" is an effective light-exiting surface thereof, and the surface of the line light source body 1222 opposite to the second edge segment indicated by "b" is an effective light-exiting surface thereof.

Figure 13:
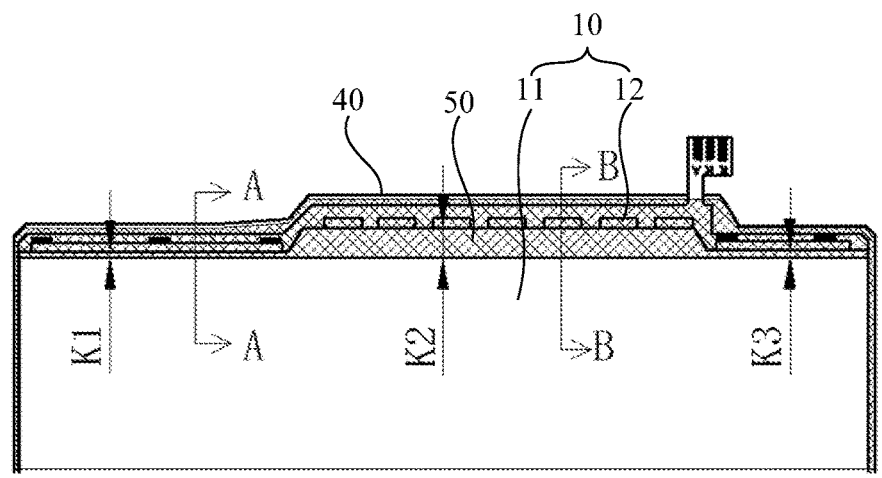
FIG. 13 is a front view of a backlight module of an embodiment of the present disclosure.
Figure 14:
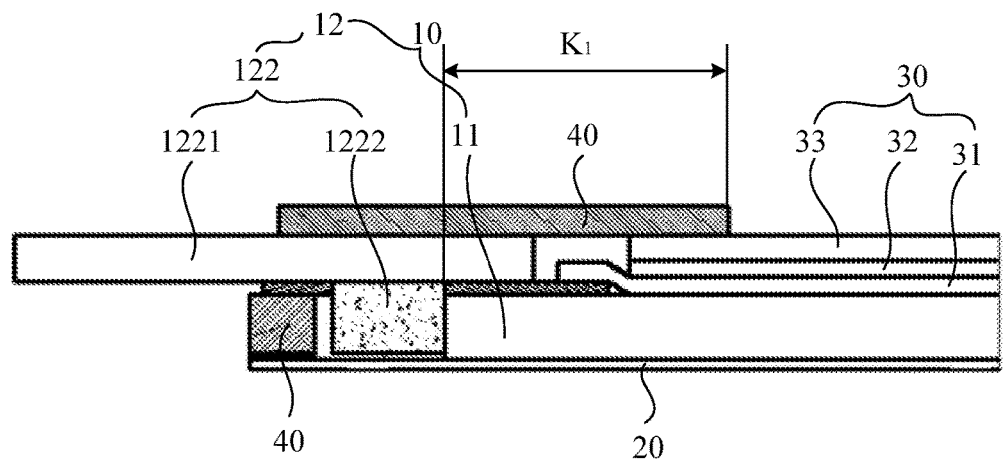
FIG. 14 is a structural schematic view of a cross-section taken along A-A of the backlight assembly shown in FIG. 13.

Furthermore, the first circuit board 1211 and the second circuit board 1221 may be parallel to or perpendicular to the light guide plate 11, and they are not particularly defined herein. However, when the first circuit board 1211 and the second circuit board 1221 are perpendicular to the light guide plate 11, widths of the first circuit board 1211 and the second circuit board 1221 may affect the thickness of the display device, which may be detrimental to the thin design of the display device. To solve this problem, it is possible that the first circuit board 1211 and the second circuit board 1221 are parallel to the light guide plate 11, as shown in FIGS. 4, 13 and 14. In this case, it is the thicknesses of the first circuit board 1211 and the second circuit board 1221 that affect the thickness of the display device. As compared with the widths of the first circuit board 1211 and the second circuit board 1221, the thicknesses of the first circuit board 1211 and the second circuit board 1221 is smaller, which has less impact on the thickness of the display device and is beneficial to the thin design of the display device. Therefore, only the case where the first circuit board 1211 and the second circuit board 1221 are both parallel to the light guide plate 11 will be described hereinafter as an example.

Further, in order to fix relative positions among the LED light 1212, the line light source body 1222 and the light guide plate 11, the first circuit board 1211 and the second circuit board 1221 may be directly fixed on the light guide plate 11, or the LED light 1212, the line light source 1222 and the light guide plate 11 may be fixed on the same bracket, so as to maintain the relative positional relationship among the LED light 1212, the line light source body 1222 and the light guide plate 11. The specific manner in which their relative positions are fixed will not be particularly defined herein. However, in order to reduce the number of the parts included in the backlight assembly 10, it is possible that the first circuit board 1211 and the second circuit board 1221 are directly fixed to the light guide plate 11. In this way, no additional bracket is needed, and the number of the parts included in the backlight assembly 10 can be reduced.

To improve the assembling efficiency of the backlight assembly 10, it is possible that the first circuit board 1211 and the second circuit board 1221 constitute an integrated circuit board, as shown in FIG. 4 or 5. In this way, the LED light bar 121 and the line light source 122 actually constitute one integral component, thus decreasing the number of the components included in the backlight assembly 10, reducing the assembly complexity thereof, and improving the assembly efficiency thereof.

In the above embodiment, to facilitate the assembly of the light bar 12 and the light guide plate 11, it is possible that an overall structure constituted by the LED light bar 121 and the line light source 122 has a length equal to the width of the light-entering end of the light guide plate 11, so that both ends of the overall structure constituted by the LED light bar 121 and the line light source 122 are aligned with both ends of the edge of the light-entering side of the light guide plate 11 so as to facilitate the assembly between the light bar 12 and the light guide plate 11.

Figure 11:
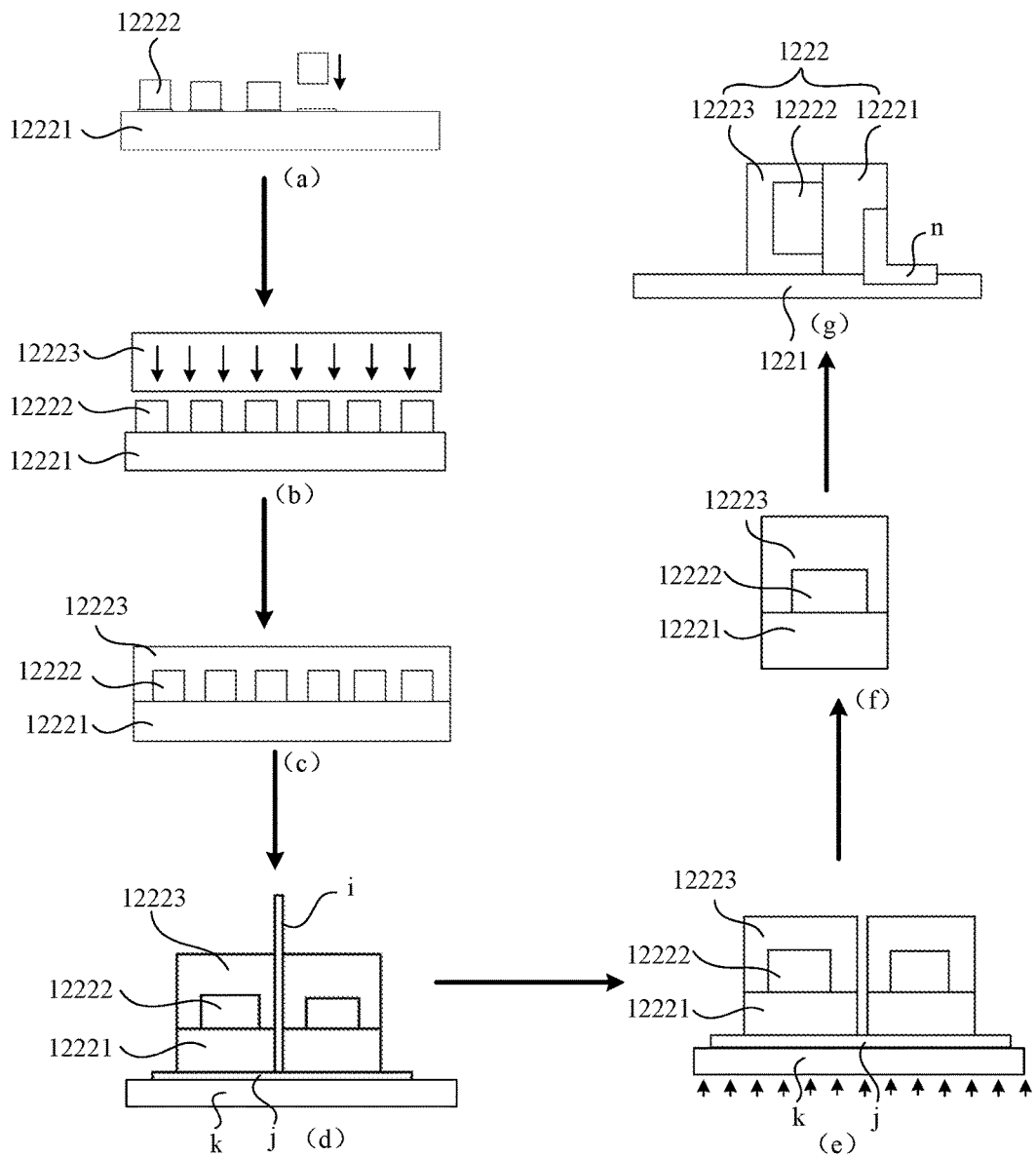
FIG. 11 is a flow chart showing a manufacturing process of a line light source body in a backlight assembly of an embodiment of the present disclosure.
Figure 12:
FIG. 12 is a top view of a line light source body in an backlight assembly of an embodiment of the present disclosure.

In the embodiment shown in FIG. 4, optionally, the structure of the line light source body 1222 may be as shown in FIGS. 11(f) and 12. In other words, the line light source body 1222 includes a circuit substrate 12221, a plurality of light-emitting chips 12222 and a fluorescent film 12223. The fluorescent film 12223 is a thin film formed by mixing different proportions of fluorescent powder, and the circuit substrate 12221 has a strip shape. The plurality of light-emitting chips 12222 are all attached on the circuit substrate 12221, and evenly spaced apart in a longitudinal direction of the circuit substrate 12221. The fluorescent film 12223 is provided on the circuit substrate 12221 and covers the plurality of light-emitting chips 12222. In this way, light emitted from the plurality of light-emitting chips 12222 may excite the fluorescent film 12223 to emit linear light. Such a structure is simple and easy to implement. Moreover, the light-emitting chips are directly attached on the circuit substrate 12221 to form a chip-on-board (COB) structure, which is beneficial to the reduction of the volume of the line light source body 1222.

As shown in FIG. 12, the size and number of the light-emitting chips 12222 are not defined, and may be determined as actually needed.

In addition, as shown in FIG. 12, the plurality of light-emitting chips 12222 may be connected in parallel or in series through the board substrate 12221, and then packaged through the fluorescent film 12223. The specific connection manner will not be particularly defined herein.

Furthermore, a manufacturing process of the line light source body 1222 may be as shown in FIGS. 11(*a*) to 11(*f*). Specifically, the process may include the following steps: a first step of providing light-emitting chips 12222 on a circuit substrate 12221 as shown in FIG. 11(*a*); a second step of pressing a fluorescent film 12223 on a side of the circuit substrate 12221 on which the light-emitting chips 12222 have been attached, as shown in FIG. 11(*b*), so that the fluorescent film 12223 covers the light-emitting chips 12222 to form a surface light source; a third step of curing the surface light source, for example, by baking, to obtain a structure as shown in FIG. 11(*c*); a fourth step of attaching the surface light source to a transparent carrier substrate k using a blue film adhesive j, and cutting the surface light source by a blade i into a plurality of line light source bodies, as shown in FIG. 11(*d*); and a fifth step of irradiating the blue film adhesive j with ultraviolet rays from a lower side of the carrier substrate k to remove the blue film adhesive j as shown in FIG. 11(*e*), thereby achieving the separation between the plurality of line light source bodies 1222 and the carrier substrate k to obtain a plurality of line light source bodies 1222 as shown in FIG. 11(*f*). In such a manner of first forming the surface light source and then cutting it into the plurality of line light sources, it is possible to improve the forming efficiency of the line light source bodies, and facilitate a mass production of the line light sources. Moreover, the formed line light source body can produce continuous linear light, and thus exhibit excellent backlight uniformity. Meanwhile, the use of the fluorescent film for integrated packaging can reduce the loss of light refraction and eliminate the need for brackets, patches or reflow soldering during the forming process. Therefore, the cost is relatively low and the utilization efficiency of light is relatively high.

Further, since a top wall of the line light source body 1222 is opposite to the light-emitting surface of the light-emitting chips 12222, the intensity of light exiting from the top wall of the line light source body 1222 is the highest. In this case, in order to improve the light utilization efficiency of the line light source body 1222, it is possible that a side wall of the line light source body 1222 is affixed to the second circuit board 1221 with the top wall of the line light source body 1222 facing the second edge segment b, and a bottom wall of the line light source 1222 is welded to the second circuit board 1221 through fillet welding at a welding point n, as shown in FIG. 11(*g*). In this way, the line light source body 1222 is fixed to the second circuit board 1221 by the side Surface Mounted Technology (SMT), the top surface of the line light source body 1222 is an effective light-exiting surface, and the utilization efficiency of light is thus high. Moreover, no solder is required to be provided between the line light source body 1222 and the second circuit board 1221 so that the line light source body 1222 can be directly attached to the surface of the second circuit board 1221, thereby reducing a protruding height of the line light source body 1222 from the second circuit board 1221. As a result, the volume of the line light source is reduced, facilitating the mounting thereof in the space-limited display device.

Figure 6:
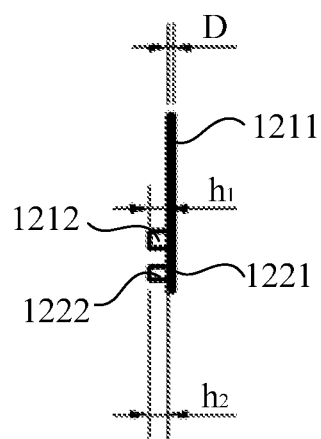
FIG. 6 is a side view of the light bar in the backlight assembly shown in FIG. 5.

In the embodiment shown in FIG. 4, it should be noted that, when designing the thickness of the light guide plate 11, it should be ensured that the thickness of the light guide plate 11 is greater than a protruding height $h_1$ of the LED light 1212 from the first circuit board 1211 and also that the thickness of the light guide plate 11 is greater than a protruding height $h_2$ of the line light source body 1222 from the second circuit board 1221, as shown in FIG. 6, so that the light-entering end surface of the light guide plate 11 can cover both the effective light-exiting surface of the LED light 1212 and the effective light-exiting surface of the line light source body 1222, so as to enable all of light emitted from the effective light-exiting surface of the LED light 1212 and from the effective light-exiting surface of the line light source body 1222 to enter the light guide plate 11.

In the embodiment shown in FIG. 4, the protruding height $h_1$ of the LED light 1212 from the first circuit board 1211 can be greater than or equal to the protruding height $h_2$ of the line light source bodies 1222 from the second circuit board 1221, and this is not particularly defined herein. However, to facilitate the design of the thickness of the light guide plate 11, it is possible that the protruding height $h_1$ of the LED light 1212 from the first circuit board 1211 is equal to the protruding height $h_2$ of the line light source body 1222 from the second circuit board 1221, as shown in FIG. 6. In this case, when designing the thickness of the light guide plate 11, it is only required to consider one of the heights $h_1$ and $h_2$, and it is not necessary to consider both of them. Therefore, this can facilitate the design of the thickness of the light guide plate 11.

Figure 9:
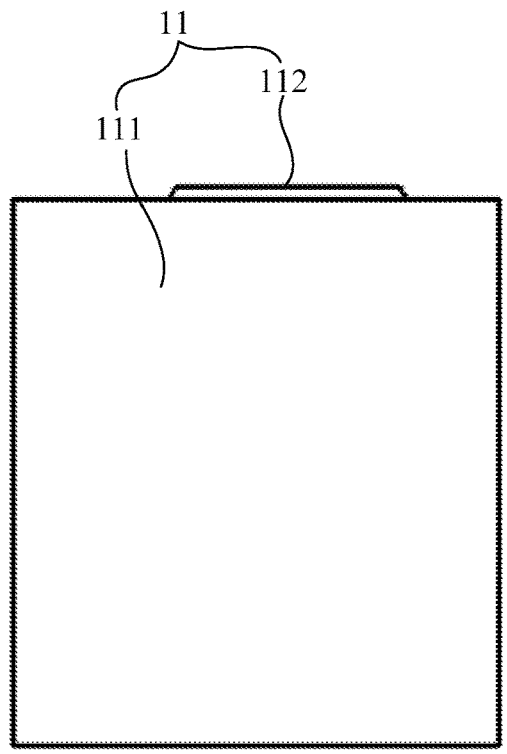
FIG. 9 is a front view of another light guide plate in a backlight assembly of an embodiment of the present disclosure.
Figure 10:
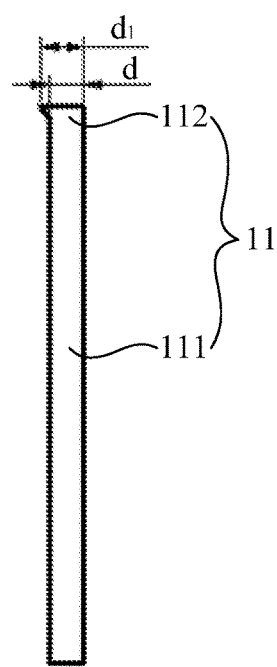
FIG. 10 is a side view of the light guide plate in the backlight assembly shown in FIG. 9.

In the above embodiment, when the protruding height $h_1$ of the LED light 1212 from the first circuit board 1211 is greater than the protruding height $h_2$ of the line light source body 1222 from the second circuit board 1221, for the purpose of ensuring that all the light emitted from the effective light-exiting surface of the LED light 1212 and from the effective light-exiting surface of the line light source body 1222 enter the light guide plate 11, a common solution is to make the thickness of the light guide plate 11 greater than the protruding height $h_1$ of the LED light 1212 from the first circuit board 1211, so that the light-entering end surface of the light guide plate 11 covers both the effective light-exiting surface of the LED light 1212 and the effective light-exiting surface of the line light source body 1222. However, this also increases the thickness of the light guide plate 11. To solve this problem, alternatively as shown in FIG. 9 and FIG. 10, the light guide plate 11 includes a main body portion 111, and a protruding portion 112 protruding from a position of the edge of the light-entering end other than the second edge segments b in a direction facing away from the light guide plate 11. A thickness of the main body portion 111 is d, which satisfies the requirement $h_1 > d > h_2$ to ensure that all the light emitted from the light-exiting surface of the line light source body 1222 can enter the light guide plate 11. Moreover, in the protruding direction of the protruding portion 112, the thickness of the protruding portion 112 is gradually increased from d to $d_1$ which is greater than $h_1$. Thus, the protruding portion 112 forms a flared structure which can ensure all the light emitted from the effective light-exiting surfaces of the LED lights 1212 can enter the light guide plate 11. In such a solution, since the thickness d of the main body portion of the light guide plate 11 is less than the protruding height $h_1$ of the LED light 1212 from the first circuit board 1211, this solution is beneficial to the thin design of the display device.

In the embodiment shown in FIG. 4, a protruding distance of the first edge segment a from the position of the edge of the light-entering end of the light guide plate other than the second edge segments b is not particularly defined herein. However, to realize a narrow-bezel design of the display device, as shown in FIGS. 7A, 7B, 7C and 8, alternatively, the protruding distance m of the first edge segment a from the position of the edge of the light-entering end of the light guide plate other than the second edge segments b is less than or equal to 2.5 mm. Thus, it can be avoided that the width of the bezel at the first edge segment a is too large due to the too large protruding distance of the first edge segment a from the position of the edge of the light-entering end of the light guide plate other than the second edge segments b, thereby facilitating the narrow-bezel design of the display device.

In the embodiment as shown in FIG. 5, the thicknesses of the first circuit board 1211 and the second circuit board 1221 are not particularly defined herein. However, to facilitate the mounting in the space-limited display device, alternatively as shown in FIG. 6, the thicknesses D of both the first circuit board 1211 and the second circuit board 1221 are 0.12 mm, 0.1 mm, 0.08 mm, or less than 0.08 mm. When the thicknesses D of the first circuit board 1211 and the second circuit board 1221 are within such a range, their thicknesses are small, which facilitates the mounting in the space-limited display device.

In the embodiment as shown in FIG. 6, the protruding height $h_2$ of the line light source body 1222 from the second circuit board 1221 is not particularly defined herein. However, to reduce the thickness of the display device, it is possible that the protruding height $h_2$ of the line light source body 1222 from the second circuit board 1221 is 0.4 mm, 0.35 mm, or 0.3 mm. When the protruding height $h_2$ of the line light source body 1222 from the second circuit board 1221 is within such a range, the protruding height is relatively small, and thus has less impact on the thickness of the display device, thereby facilitating the reduction in the thickness of the display device and realizing the thin design of the display device.

In the embodiment as shown in FIG. 4, a width of a gap between the LED light and the first edge segment a is not particularly defined herein. Moreover, a width of a gap between the line light source body and the second edge segment b is not particularly defined herein either. To reduce the possibility of light emitted from the light-exiting surfaces of the LED light and from the light-exiting surfaces of the line light source bodies entering regions other than the light guide plate 11 and also to realize a narrow-bezel design of the display device, it is possible that the width of the gap between the LED light and the first edge segment a and the width of the gap between the line light source bodies and the corresponding second edge segments b are both less than or equal to 0.12 mm. In this case, the gap widths are small, which can realize the above-mentioned purposes.

FIG. 13 shows a backlight module provided in an embodiment of the present disclosure, which includes the backlight assembly 10 in any of the technical solutions as described above.

Since the backlight assembly 10 used in the backlight module of this embodiment is the same as that provided in the embodiments of the backlight assembly 10 as described above, the backlight module can solve the same technical problems and achieve the same expected effects as the backlight assembly 10 as described above.

Figure 15:
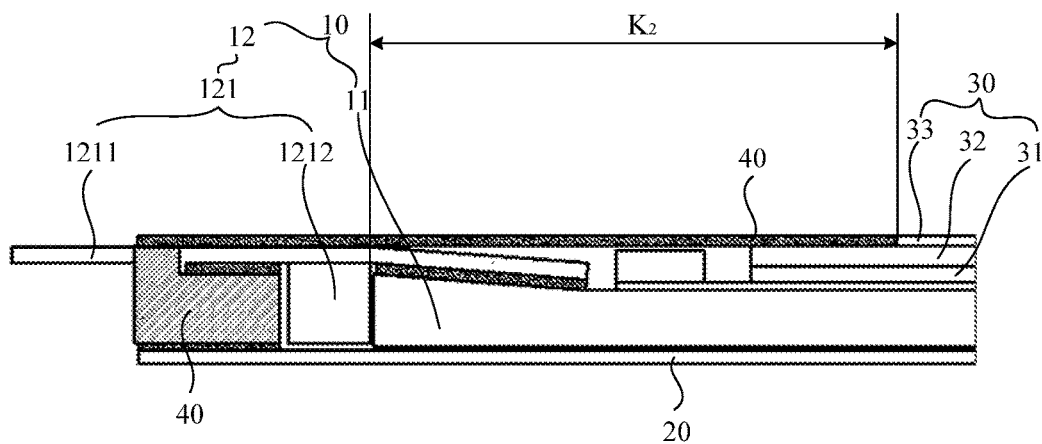
FIG. 15 is a structural schematic view of a cross-section taken along B-B of the backlight assembly shown in FIG. 13.

In the above embodiment, in addition to the backlight assembly 10, the backlight module includes a reflector 20, an optical film assembly 30 and a plastic frame 40, as shown in FIGS. 13, 14 and 15. The reflector 20 is provided on a back side of the backlight assembly 10 to reflect light such that light from the backlight assembly 10 emits from a front side thereof. The optical film assembly 30 is provided on a light-exiting surface of the backlight assembly 10, and includes a diffusion sheet 31, a lower prism sheet 32, an upper prism sheet 33 and the like. The plastic frame 40 is provided around side walls of the backlight module 10.

As shown in FIGS. 13, 14 and 15, the backlight module further includes a light-shielding tape 50 which covers the light-exiting side of the light guide plate 11 in the backlight assembly 10. A distance $K_1$ from an inner edge of the light-shielding tape to the effective light-exiting surface of the line light source body 1222 in the backlight assembly 10 is in a range of 0.8 mm to 1.5 mm, and a distance K2 from an inner edge of the light-shielding tape to the effective light-exiting surface of the LED light 1212 in the backlight assembly 10 is in a range of 2.0 mm to 3.5 mm. In this case, a moderate width of the bezel is covered by the light-shielding tape, which can reduce the width of the bezel on the side of the display device provided with the light bar as much as possible while ensuring the display quality of the display device.

In the above embodiment, it should be noted that the inner edge of the light-shielding tape refer to an edge of a side of the light-shielding tape close to a center of the light-exiting surface of the backlight module. The light-shielding tape may be directly adhered to the plastic frame, or may be adhered to other structures of the backlight module. The specific situation will not be particularly defined.

An embodiment of the present disclosure further provides a display device including the backlight module in any of the technical solutions as described above.

Since the backlight module used in the display device of this embodiment is the same as that provided in each of the above embodiments of the backlight module, the display device can solve the technical problem and achieve the same expected effect as the backlight module described above.

The display device of the embodiment of the present disclosure may be a display for a mobile phone, a tablet computer, a desktop computer, etc., which is not particularly defined here. In the case where the display device is a display for a mobile phone, a tablet computer or a desktop computer, other components of the display device of the embodiment of the present disclosure are well known to those skilled in the art, and will not be described in detail herein.

The above are merely specific embodiments of the present disclosure, and the protection scope of the present disclosure is not limited thereto. Within the technical scope disclosed by the present disclosure, a person skilled in the art can readily envisage changes or replacements which should also fall within the protection scope of the present disclosure. Therefore, the protection scope of the present disclosure should be determined based on the appended claims.

What is claimed is:

1. A backlight assembly, comprising a light guide plate and a light bar,
    wherein an edge of a light-entering end of the light guide plate comprises one or more first edge segments and one or more second edge segments, the one or more first edge segments protrude from one or more positions of the edge of the light-entering end of the light guide plate other than a position of the one or more second edge segments, in a direction facing away from the light guide plate, and
    wherein the light bar comprises one or more Light Emitting Diode (LED) light bars disposed on one or more light-entering sides of the one or more first edge segments, and one or more line light sources disposed on one or more light-entering sides of the one or more second edge segments.

2. The backlight assembly according to claim 1, wherein there are at least two second edge segments, and the at least two second edge segments comprise two second edge segments constituting two end segments of the edge of the light-entering end of the light guide plate.

3. The backlight assembly according to claim 2, wherein one first edge segment of the one or more first edge segments constitutes an intermediate segment between the two end segments of the edge of the light-entering end of the light guide plate, and the two second edge segments constituting the two end segments of the edge of the light-entering end are symmetrical to each other with respect to the intermediate segment.

4. The backlight assembly according to claim 2, wherein extension directions of the line light sources disposed on the light-entering sides of the at least two second edge segments are in a same straight line.

5. The backlight assembly according to claim 1, wherein each of the one or more LED light bars comprises a first circuit board and a plurality of LED lights disposed on the first circuit board, and each of the one or more line light sources comprises a second circuit board and a line light source body disposed on the second circuit board.

6. The backlight assembly according to claim 5, wherein the first circuit board and the second circuit board constitute an integrated circuit board.

7. The backlight assembly according to claim 5, wherein each line light source body comprises a circuit substrate, a plurality of light-emitting chips and a fluorescent film, wherein the circuit substrate has a strip shape, the plurality of light-emitting chips are all attached to the circuit substrate and arranged to be evenly spaced apart in a longitudinal direction of the circuit substrate, and the fluorescent film is provided on the circuit substrate and covers the plurality of light-emitting chips.

8. The backlight assembly according to claim 5, wherein each line light source body has a side wall that is attached to the corresponding second circuit board, a top wall that is opposite to the corresponding second edge segment, and a bottom wall that is welded to the corresponding second circuit board by a fillet weld at one or more welding points.

9. The backlight assembly according to claim 5, wherein a protruding height of each LED light from each corresponding first circuit board is equal to a protruding height of each line light source body from each corresponding second circuit board.

10. The backlight assembly according to claim 5, wherein a protruding height of each LED light from each corresponding first circuit board is $h_1$, a protruding height of each line light source body from each corresponding second circuit board is $h_2$, and $h_1$ is greater than $h_2$.

11. The backlight assembly according to claim 10, wherein the light guide plate comprises a main body portion having a thickness of d, and a protruding portion arranged to protrude from a portion of the edge of the light-entering end other than the one or more second edge segments, in a direction facing away from the main body portion, wherein d is less than $h_1$ but greater than $h_2$, and in the protruding direction of the protruding portion, a thickness of the protruding portion gradually increases from d to $d_1$ that is greater than $h_1$.

12. The backlight assembly according to claim 1, wherein a protruding distance of each first edge segment from each corresponding position of the edge of the light-entering end of the light guide plate other than the one or more second edge segments, in the direction facing away from the light guide plate, is less than or equal to 2.5 mm.

13. The backlight assembly according to claim 5, wherein thicknesses of each first circuit board and each second circuit board are 0.12 mm, 0.10 mm, 0.08 mm, or less than 0.08 mm.

14. The backlight assembly according to claim 5, wherein a protruding height of each line light source body from each corresponding second circuit board is 0.40 mm, 0.35 mm or 0.30 mm.

15. The backlight assembly according to claim 5, wherein a gap between each first edge segment and each corresponding LED light and a gap between each second edge segment and each corresponding line light source body have a width that is less than or equal to 0.12 mm.

16. The backlight assembly according to claim 1, wherein a number of the first edge segments is one, two or three.

17. A backlight module, comprising the backlight assembly according to claim 1.

18. The backlight module according to claim 17, further comprising a light-shielding tape configured to cover a light-exiting side of the light-entering end of the light guide plate in the backlight assembly.

19. The backlight module according to claim 18, wherein a distance from an inner edge of the light-shielding tape to an effective light-exiting surface of the or each line light source body in the backlight assembly is in a range of 0.8 mm to 1.5 mm, and/or a distance from the inner edge of the light-shielding tape to an effective light-exiting surface of the or each LED light in the backlight assembly is in a range of 2.0 mm to 3.5 mm.

20. A display device, comprising the backlight module according to claim 17.

* * * * *

UNITED STATES PATENT AND TRADEMARK OFFICE
CERTIFICATE OF CORRECTION

PATENT NO. : 10,203,448 B1
APPLICATION NO. : 15/968698
DATED : February 12, 2019
INVENTOR(S) : Wenjun Li It is certified that error appears in the above-identified patent and that said Letters Patent is hereby corrected as shown below:

On the Title Page

Column 1, Item (73) Assignees Section:
Delete "BOE TECHNOLOGY GROUP CO., LTD.
BEIJING BOE CHANTANI ELECTRONICS CO., LTD."
Insert -- BOE TECHNOLOGY GROUP CO., LTD.
BEIJING BOE CHATANI ELECTRONICS CO., LTD. --

Signed and Sealed this
Twenty-first Day of May, 2019

Andrei Iancu
*Director of the United States Patent and Trademark Office*